United States Patent
Tárrago Mingo et al.

(10) Patent No.: US 9,752,680 B2
(45) Date of Patent: Sep. 5, 2017

(54) SEALING RING FOR CONTAINER

(75) Inventors: Santiago Tárrago Mingo, Burgos (ES);
Andrés Hernando Saiz, Burgos (ES)

(73) Assignee: HIPERBARIC, S.A., Burgos (ES)

( * ) Notice: Subject to any disclaimer, the term of this patent is extended or adjusted under 35 U.S.C. 154(b) by 0 days.

(21) Appl. No.: 14/372,775

(22) PCT Filed: Jan. 20, 2012

(86) PCT No.: PCT/ES2012/070030
§ 371 (c)(1),
(2), (4) Date: Jul. 17, 2014

(87) PCT Pub. No.: WO2013/107915
PCT Pub. Date: Jul. 25, 2013

(65) Prior Publication Data
US 2015/0008225 A1    Jan. 8, 2015

(51) Int. Cl.
*F17C 13/06* (2006.01)
*F16J 15/06* (2006.01)
*F16J 13/08* (2006.01)
*F16J 15/10* (2006.01)

(52) U.S. Cl.
CPC .............. *F16J 15/062* (2013.01); *F16J 13/08* (2013.01); *F16J 15/104* (2013.01)

(58) Field of Classification Search
CPC ........ Y10S 277/91; F16L 17/08; F16L 15/004
USPC ....................................................... 220/582
See application file for complete search history.

(56) References Cited

U.S. PATENT DOCUMENTS

| | | | |
|---|---|---|---|
| 4,443,016 A * | 4/1984 | Schungel | F16J 10/02 220/240 |
| 4,562,798 A | 1/1986 | Van Os | |
| 6,736,407 B2 * | 5/2004 | Tremoulet, Jr. | F16J 15/121 220/234 |
| 2007/0039968 A1 * | 2/2007 | Ting | F16J 15/127 220/582 |
| 2010/0258311 A1 * | 10/2010 | Craig | E21B 29/10 166/277 |

FOREIGN PATENT DOCUMENTS

| | | |
|---|---|---|
| EP | 0659942 A2 | 6/1995 |
| ES | 282924 U | 5/1985 |
| NL | 25044 C | 4/1931 |
| NL | 8304326 A | 7/1984 |
| WO | 2007020099 A2 | 2/2007 |

OTHER PUBLICATIONS

Chinese Office Action issued Jul. 21, 2015 re; Application No. 201280065353.9; citing: US 2007/0039968 A1 and US 4562798 A.
International Search Report for corresponding application PCT/ES2012/070030 filed Jan. 20, 2012; Mail date Oct. 18, 2012.

* cited by examiner

*Primary Examiner* — Shawn M Braden
(74) *Attorney, Agent, or Firm* — Cantor Colburn LLP

(57) ABSTRACT

A high pressure vessel sealing ring formed by an annular body made up of at least two parts, a polymer gasket and a sealing gasket, wherein the ring is in contact with the surface of a high pressure lid and with the surface of a vessel and includes at least a first part coupled by means of a mechanical stop to a second part which is concentric to the first part, where the radius of the second part is of the same or different size with respect to the radius of the first part.

10 Claims, 2 Drawing Sheets

A-A

SEALING RING FOR CONTAINER

TECHNICAL FIELD

The present invention has application in the sector of closing systems and more specifically in sealing systems for vessels subjected to high pressure, and relates to a vessel sealing ring which allows an optimum sealing for a prolonged service life and a reduction of damage in the sealed vessel More specifically, the invention allows for increasing the quality and durability of the sealing, reducing the damage caused by erosion and scratching in the sealed vessel, using the properties of materials favorable for it, which cannot be found in a single material.

BACKGROUND

One of the main problems existing today in the sector of sealing systems for vessels subjected to high pressure is the existing limitation when it comes to finding a sealing system which confers an optimum sealing while at the same time a prolonged service life due to the fact that there is no material having the properties intended to fulfill said needs arising from the task to be performed by the sealing.

It has been considered until now that the best option is to use a high strength material with a low Young's modulus so that it can be easily expanded for closing the existing gap with the high pressure vessel, making the stresses generated in the gasket the lowest possible, for which in some cases adding an anti-friction coating to reduce the damage which can be suffered by the vessel has been considered.

These anti-friction treatments render anti-friction characteristics to the part with which the friction is produced; there being the problem that, upon opening and closing the vessel for loading the product, since water is used as the pressurizing means for the high pressure vessels, it eliminates the anti-friction characteristics of the actuation area, with the subsequent problem of having to find a material which, in addition to having a prolonged fatigue life, provides the sealing with favorable properties such as a low Young's modulus so that the operation of the metal ring is favorable so that the polymer gaskets work upon closing the gap with the high pressure vessel, an excellent fracture toughness so that its life is prolonged, a high mechanical strength for supporting high stresses due to the ultrahigh pressures and a low coefficient of friction with stainless steel for reducing the friction of the vessel-contacting surface of the ring, since the support rings which have been used until now frequently fail due to fatigue, causing irreparable damage to the high pressure vessels to be sealed with their breakages.

Some documents, such as Spanish document no. ES0282924-U, describes a high pressure vessel with inner closing wherein an obturating ring divided into two sections which acts by means of wedging is different, the two-part arrangement of the ring being intended for functions different from the functions of conferring specific properties to obtain the advantages indicated by the double sealing ring, therefore it would not solve the problem described.

There is also another document no. WO2007/020099-A2 describing a sealing gasket with a metal support ring with a coating to reduce the friction and two polymer seals, said ring not being divided into two or more differentiated parts of different materials, and said ring having a different configuration with different effects.

BRIEF SUMMARY

The present invention relates to a vessel sealing ring which allows increasing the quality of the sealing due to the fact that the annular body thereof is made of at least two parts with materials having different properties directed to the function of each part of the ring, and it also proposes reducing the damage from erosion and scratching in the sealed vessel by increasing the fatigue life due to configuring the functional parts of the ring with more than one material providing the different properties mentioned above which cannot be found in any other material, and with a design such that the greatest stresses produced in the ring which are those produced in the outer diameter of the outer part due to the contact with the vessel and at which the circumferential stresses are very high, are eliminated.

The vessel sealing ring is formed by an annular body, a polymer gasket where said polymer gasket can be located between the annular body and the vessel and a sealing gasket where said sealing gasket can be located between the annular body of the sealing ring and the cover for the vessel, where said annular body can be in contact with the surface of a high pressure lid and with the surface of a vessel, and where said annular body can comprise, at least a first part coupled by means of a mechanical stop to a second part concentric to said first part, where the radius of the second part and the radius of the first part are of the same or different size.

The pressure exerted on the sealing ring produces stresses which expand the annular body of the sealing ring which is in contact with two sealing surfaces, such that the gaps existing between the annular body and the first surface which is a cover for the vessel and between the annular body and the second surface which is the vessel itself are closed, thus preventing both the sealing gasket in the first case and the polymer gasket in the second from extruding through the initially existing gaps.

Said annular body can be expanded due to the fact said annular body can comprise two parts which can be fitted to one another, one of both parts being able to be divided such that it can be expanded without said second part generating circumferential stresses on said first part.

The first part can be an outer ring which can be in contact with the vessel surface and with the lid surface.

The second part can be an inner ring which can be in contact with the lid surface.

The first part can be divided for the purpose of eliminating circumferential stresses due to its expansion while the sealing ring works.

In another possible embodiment of the invention the first part and the second part can simply be banded together without introducing residual stresses or, which may be more common, introducing residual compressive stresses in the inner ring which would increase the fatigue life. Residual compressive stresses can also be introduced in said first part to reduce the tensile stresses on the outer surface thereof which cause the breakage by fracturing, thus increasing the fatigue life.

The first and second part can be made of a metal with a mechanical strength between 550 MPa and 2000 MPa, a Young's modulus having a value less than 135000 MPa and high fracture toughness.

The first part can be made of a metal having a low coefficient of friction with the material of the vessel and a high mechanical strength to enable supporting the stresses generated by the high pressure.

The cut made on the first part can be a diagonal plane with respect to the radius of the ring.

The metal stop can be bevel-shaped.

The polymer gasket can be in contact with the surface of the vessel and with a portion of the annular body.

The sealing gasket can be embedded between a portion of the second part and a portion of the high pressure lid.

The shape of the first part of the annular body can allow fitting said body between the lid and the vessel by means of a protuberance which can extend around the entire perimeter of the ring.

The second part can be cross-shaped

Therefore, according to the invention described, the device proposed by the invention makes up an advancement in the sealing elements for closing systems used until now and solves in a fully satisfactory manner the problem indicated above, in terms of reducing the frequency of replacing these sealing rings, which is simply performed, with the resulting cost reduction for the company and entailing lower risks by the method used, all of it through a simple and integrated design requiring only its placement in its housing.

BRIEF DESCRIPTION OF THE DRAWINGS

To complement the description that is being made and for the purpose of aiding to better understand the features of the invention according to a preferred practical embodiment thereof, a set of drawings is attached as an integral part of said description in which the following has been depicted with an illustrative and non-limiting character.

DETAILED DESCRIPTION

In view of the described drawings, how the annular body of the vessel sealing ring comprises a first part (1) and a second part (2) which are preferably an outer ring and an inner ring, concentric and coupled to one another by means of a bevel-shaped mechanical stop (7) which is responsible for preventing the separation of said inner and outer rings can be observed in one of the possible embodiments of the invention.

Figure 1:
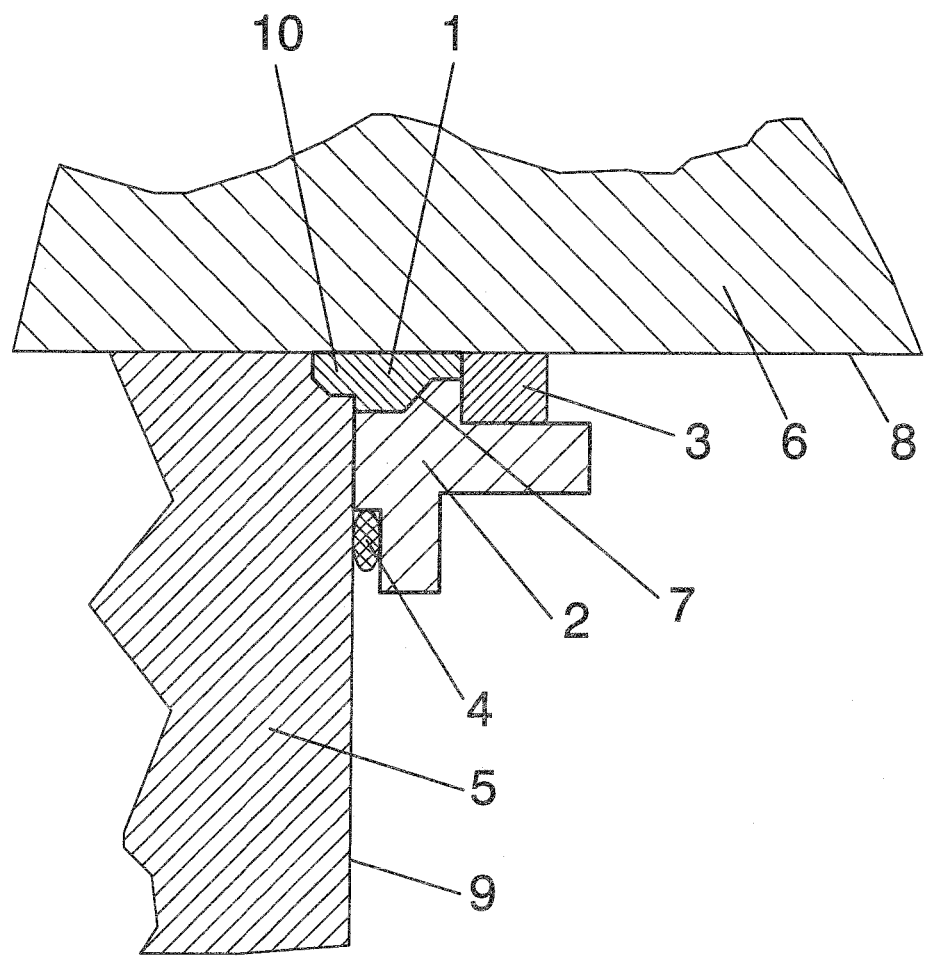
FIG. 1 shows a schematic cross-section view of all the assembled elements of the vessel sealing ring proposed by the invention located inside the vessel for sealing the closure.

The inner ring has a protuberance (10) extending around its entire perimeter for the purpose of enabling fitting in the high pressure lid, and one of the sides has a smooth vertical wall adapted to locate a polymer gasket (3) assuring the sealing between the outer ring and the vessel (6), as can be seen in FIG. 1.

The inner ring which is preferably manufactured from titanium alloy and preferably has a cross-shaped section of which an elevated portion rests on the outer ring and another elevated portion rests on the high pressure lid surface (9) such that it is extended generating a groove around the entire perimeter together with the high pressure lid surface (9), where a sealing gasket (4) which is responsible for sealing the gap is located between the inner ring and the high pressure lid (5), as can be seen in FIG. 1.

Figure 2:
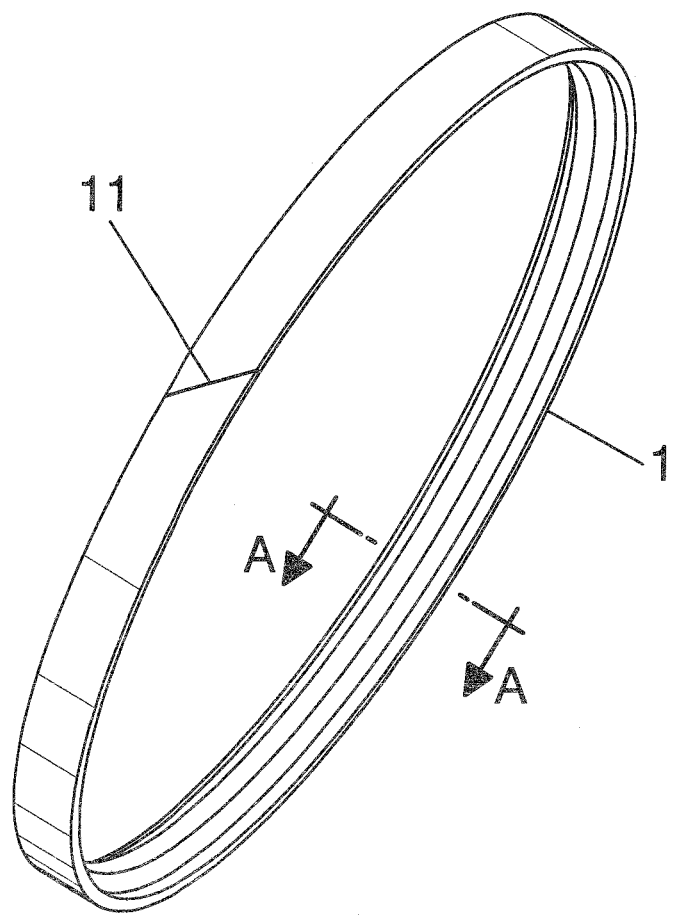
FIG. 2 shows a perspective view of the first part of the annular body, in which the diagonal cut which has been made to release the stresses can be seen. This figure shows the cut in section A-A the detail of which is observed in the following figure.

The outer ring of this embodiment is preferably manufactured from a copper alloy and it is divided by means of one narrowest possible controlled cut (11) with a specific angle, preferably of 45°, which allows the outer ring to be closed completely when it is not subjected to pressure, and the gasket to open when the diameter increases as the vessel is pressurized, thus maintaining a controlled and small enough gap so that the polymer gasket does not extrude, as can be seen in FIG. 2.

Figure 3:
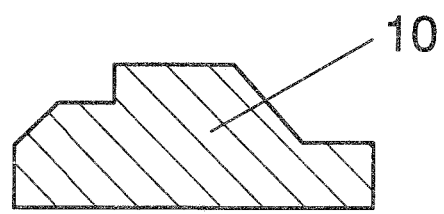
FIG. 3 shows a view of the section A-A of the annular body of FIG. 2.

The cross-section of the first part (1) of the annular body of the sealing ring is observed in FIG. 3, where the protuberance (10) extending around its entire perimeter is shown for the purpose of enabling fitting in the high pressure lid (5), as shown in FIG. 1.

In view of this description and set of drawings, the person skilled in the art will understand that the embodiments of the invention which have been described can be combined in many ways. The invention has been described according to several preferred embodiments thereof, but for the person skilled in the art it will be evident that multiple variations can be introduced in said preferred embodiments.

The invention claimed is:

1. A vessel sealing ring for vessels subjected to high pressure comprising an annular body, a polymer gasket and a sealing gasket, wherein the annular body is in contact with a surface of a high pressure lid and with a surface of a high pressure vessel, and wherein said annular body comprises at least a first part and a second part which are concentric and coupled to one another by means of a mechanical stop, wherein a radius of the second part and a radius of the first part are a same or different size,
    wherein the first part of the annular body is an outer ring which is in contact with the vessel surface and with the lid surface,
    wherein the second part of the annular body is an inner ring which is in contact with the lid surface,
    wherein the high pressure exerted on the sealing ring produces stresses which expand the annular body, such that gaps between the annular body and the vessel surface and lid surface are closed, preventing both the polymer gasket and the sealing gasket from extruding,
    wherein the first part and the second part of the annular body are made with materials having different properties for increasing the fatigue life and reducing the damage from erosion and scratching,
    wherein the first part and the second part are expandable due to stresses produced by a pressure exerted on the sealing ring,
    wherein the first part and the second part of the annular body are made of a metal with a mechanical strength between 550 MPa and 2000 MPa,
    wherein the first part and the second part of the annular body are made of a metal with a Young's modulus having a value less than 13500 MPa,
    wherein the second part of the annular body is made of a metal having a high fracture toughness, and
    wherein the first part of the annular body is made of a metal having a low coefficient of friction with the material of the vessel.

2. The vessel sealing ring according to claim 1, wherein the first part is divided by means of a cut, such that the first part can be expanded without the second part generating circumferential stresses on said first part.

3. The vessel sealing ring according to claim 1, wherein the first part and the second part are banded together.

4. The vessel sealing ring according to claim 3, wherein while the first part and the second part of the annular body are banded together, residual stresses have been introduced in said first part to increase fatigue life.

5. The vessel sealing ring according to claim 1, wherein a cut made on the first part is a diagonal plane with respect to the radius of the first part of the annular body.

6. The vessel sealing ring according to claim 1, wherein the mechanical stop is bevel shaped.

7. The vessel sealing ring according to claim 1, wherein the polymer gasket is in contact with the vessel surface and with a portion of the annular body.

8. The vessel sealing ring according to claim 1, wherein the sealing gasket is embedded between a portion of the second part of the annular body and a portion of the high pressure lid.

9. The vessel sealing ring according to claim 1, wherein the shape of the first part of the annular body allows fitting the annular body between the lid and the vessel by means of a protuberance extending around the entire perimeter of the ring.

10. The vessel sealing ring according to claim 1, wherein the cross section of the second part of the annular body is cross shaped.

* * * * *